Sept. 29, 1964 W. HENN ETAL 3,151,240

CARRIER SIGNAL ATTENUATION AS A FUNCTION OF TWO VARIABLES

Filed Sept. 27, 1960 4 Sheets-Sheet 1

INVENTORS
WILLIAM HENN
ARTHUR S. ROBINSON
BY Charles J. Worth
AGENT

Sept. 29, 1964 W. HENN ET AL 3,151,240

CARRIER SIGNAL ATTENUATION AS A FUNCTION OF TWO VARIABLES

Filed Sept. 27, 1960 4 Sheets-Sheet 2

INVENTORS
WILLIAM HENN
ARTHUR S. ROBINSON
BY Charles J. Worth
AGENT

INVENTORS
WILLIAM HENN
ARTHUR S. ROBINSON
BY Charles J. Worth
AGENT

CARRIER SIGNAL ATTENUATION AS A FUNCTION OF TWO VARIABLES

Filed Sept. 27, 1960 4 Sheets-Sheet 4

INVENTORS
WILLIAM HENN
ARTHUR S. ROBINSON
BY Charles J. Worth
AGENT

United States Patent Office 3,151,240

Patented Sept. 29, 1964

3,151,240

CARRIER SIGNAL ATTENUATION AS A FUNCTION OF TWO VARIABLES

William Henn, Hasbrouck Heights, and Arthur S. Robinson, Allendale, N.J., assignors to The Bendix Corporation, Teterboro, N.J., a corporation of Delaware Filed Sept. 27, 1960, Ser. No. 58,789

10 Claims. (Cl. 235—197)

Figures 1, 2:
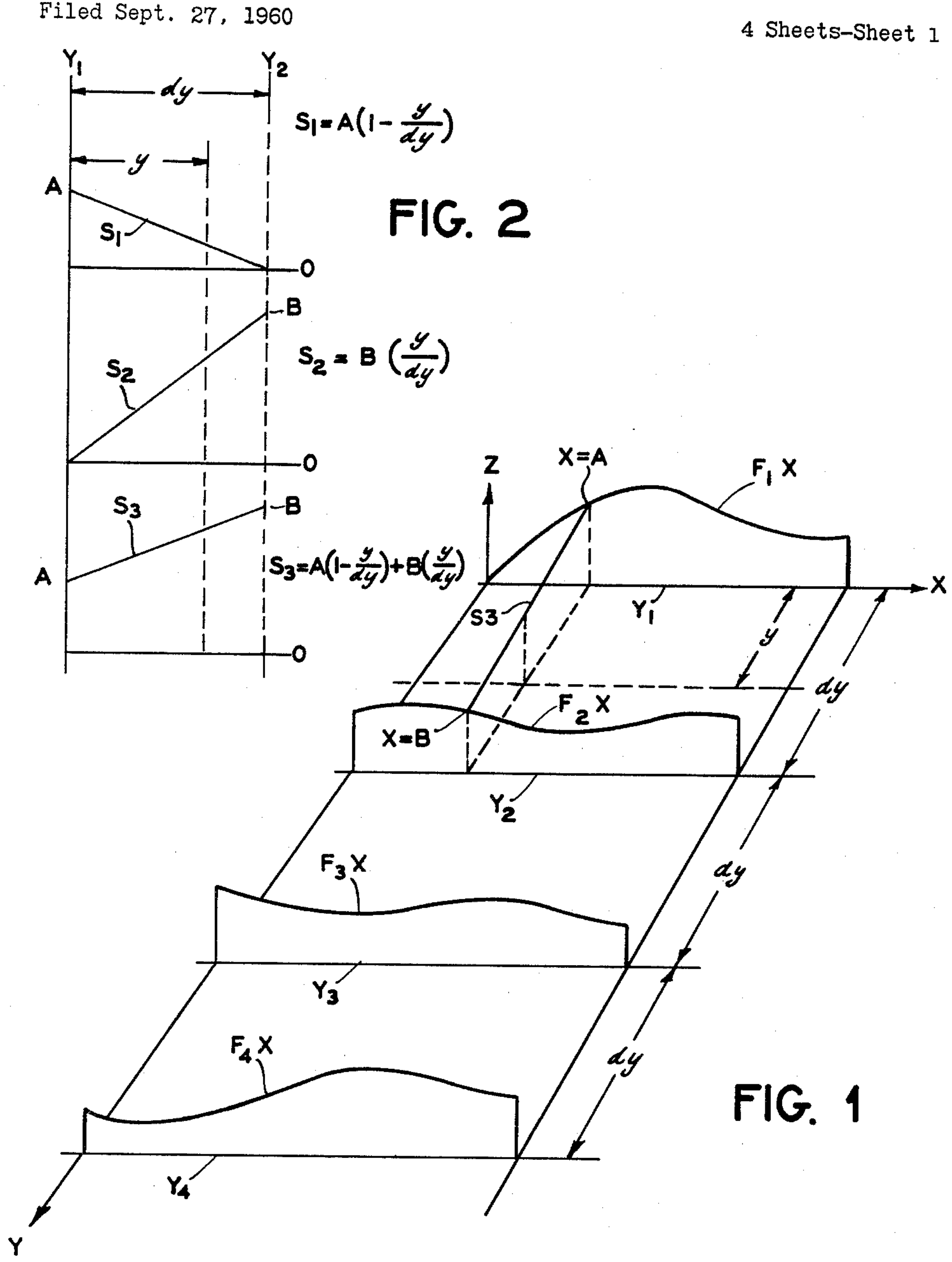

This invention relates to signal adjustment techniques and more specifically to means for attenuating an alternating voltage signal as a function of two independent variables to derive parametric gain.

This circuitry is particularly adapted for use in solid state computer control systems for vehicles capable of flight. In such systems it is necessary to modify alternating voltage or carrier signals as a function of Mach and altitude. The arrangement embodied herein includes means for providing a plurality of signals representing continuous transfer characteristics, hereinafter called transfer function signals, as a function of an independent variable at discrete step values of a second independent variable to attenuate a carrier signal. To provide a more accurate signal adjustment without requiring a matrix array of continuous transfer functions of each of the variables, means for interpolating for an intermediate value between two adjacent continuous transfer characteristics is required. The network to accomplish interpolation is novel in addition to the combination of means to adjust the carrier signal according to continuous transfer function signals of one independent variable and by discrete step signals of the second independent variable.

An object of this invention is to provide a circuit for attenuating a carrier signal by signals representing continuous transfer characteristics as a function of an independent variable and by discrete step signals as a function of a second variable.

Another object of this invention is to provide the aforementioned device having means for deriving the value of a transfer characteristic by deriving the relative proportional values of two continuous transfer characteristics as determined by interpolation between two discrete step values in response to the second variable.

Another object of this invention is to provide the aforementioned circuit having solid state equipment for deriving transfer function signals and discrete step signals, and for gating and applying the transfer function signals for attenuating the carrier signals in response to the discrete step signals.

Another object of this invention is to provide a circuit for attenuating carrier signals by signals representing continuous transfer characteristics as a function of one independent variable and discrete steps as a function of a second variable, the circuit having a plurality of function generators to derive the transfer function signals, a commutator and control device for deriving discrete step signals, linear alternating voltage attenuating means for varying the carrier signals by the continuous transfer function signals as determined by the discrete step signals, and gating means responsive to the discrete step signals for passing the transfer function signals from the function generators to the attenuating means.

Another object of this invention is to provide the aforementioned circuit having means for interpolation by providing control current proportional to an excursion of the second variable between its discrete steps to provide accurate proportional carrier signals attenuated by transfer function signals applied to the attenuating means.

This invention contemplates a circuit for attenuating a carrier signal as a function of two independent variables, comprising means for generating signals representing continuous transfer characteristics as a function of one independent variable and discrete step signals as a function of the other independent variable, attenuating means adapted to receive and to attenuate the carrier signal by the transfer function signals, gate means responsive to the discrete step signals to provide predetermined transfer function signals to the attenuating means, and means for applying control signals to the attenuating means for modifying the carrier signals attenuated by the transfer function signals according to the excursion of the other variable between its two discrete step values of the transfer function signals.

The foregoing and other objects and advantages of the invention will appear more fully hereinafter from a consideration of the detailed description which follows, taken together with the accompanying drawings wherein three embodiments of the invention are illustrated by way of example. It is to be expressly understood, however, that the drawings are for illustration purposes only and are not to be construed as defining the limits of the invention.

Figure 3:
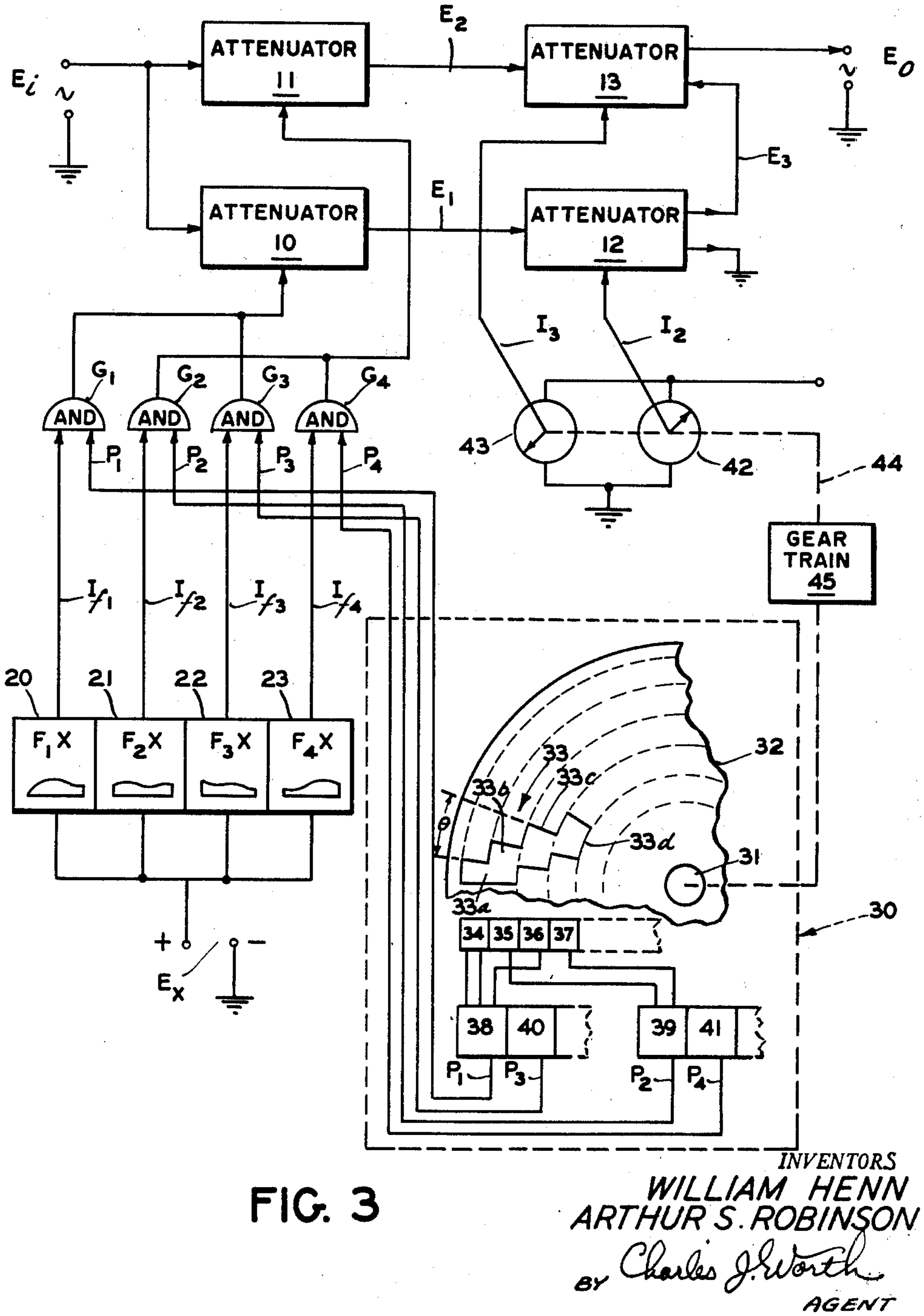
Figures 4, 5, 6:
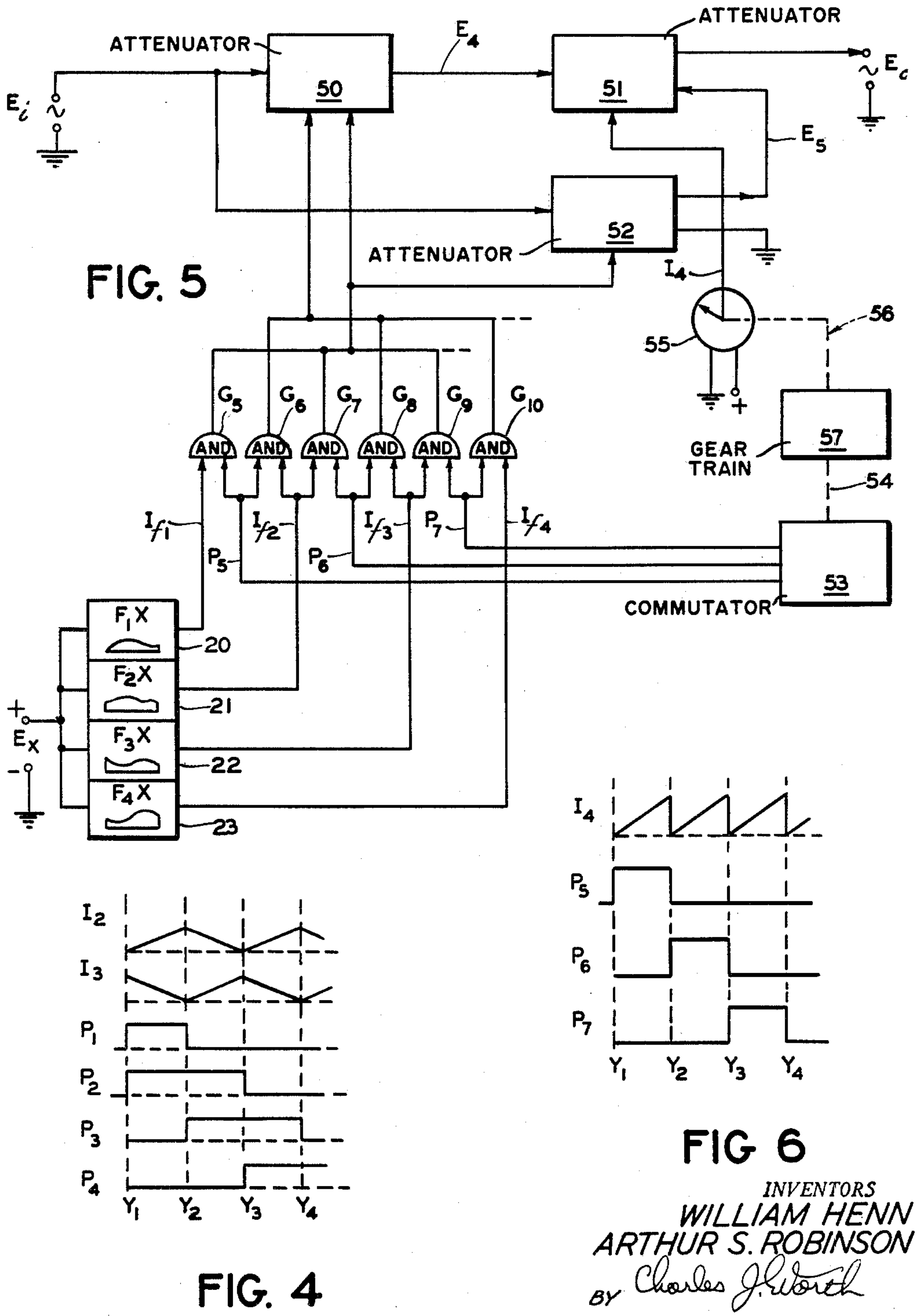
Figure 7:
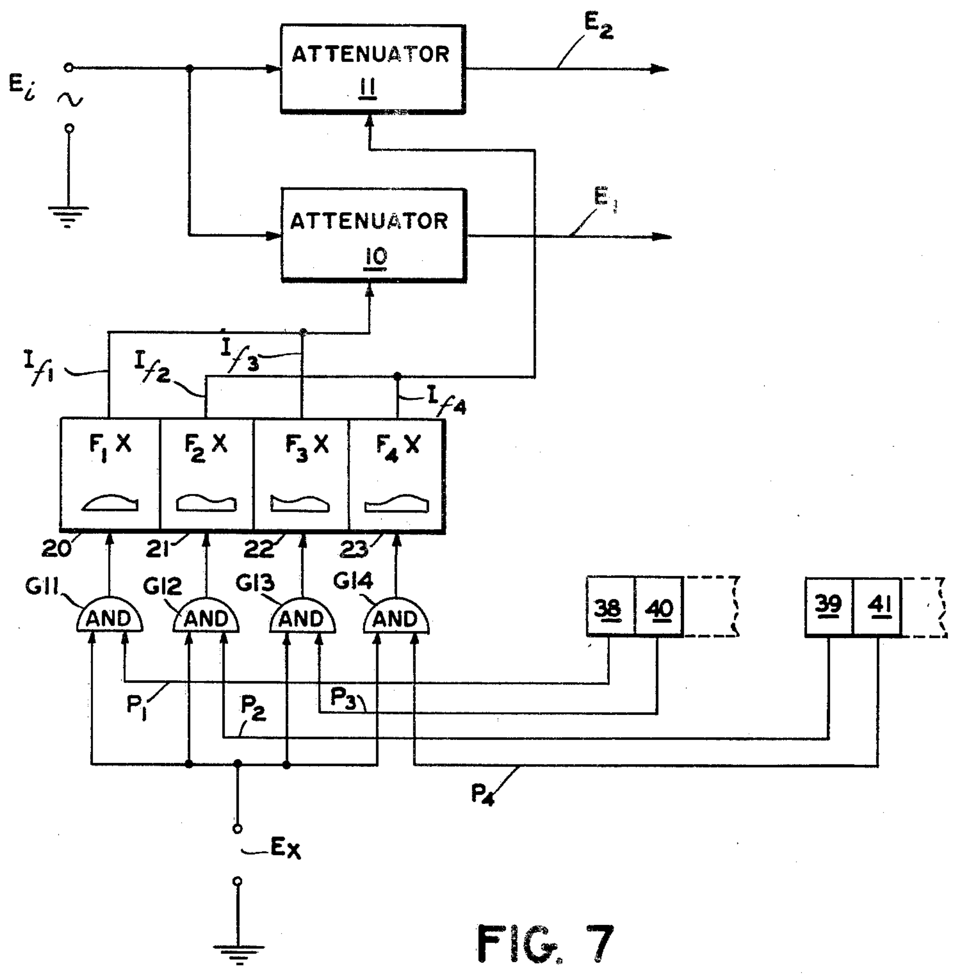

FIGURE 1 is a perspective view of a geometric showing of the disposition of a plurality of continuous transfer characteristics, FIGURE 2 is a geometric showing for mathematically solving for ramp signals, FIGURE 3 is a diagram of a novel circuit constructed according to the invention for attenuating carrier signals, FIGURE 4 is a charted showing of discrete step and ramp signals provided by the circuit of FIGURE 3, FIGURE 5 is a circuit diagram of a modification of the circuit of FIGURE 3, FIGURE 6 is a chart similar to FIGURE 4, showing signals provided by the circuit of FIGURE 5, and, FIGURE 7 is a circuit diagram of a modified portion of the circuit of FIGURE 3.

The basic concepts of this invention will be more clearly understood by referring to FIGURE 1 which shows a plurality of transfer characteristic curves $F_1X$, $F_2X$, $F_3X$ and $F_4X$ continuous along an X axis and disposed at discrete points $Y_1$, $Y_2$, $Y_3$ and $Y_4$ along a Y axis, and having variable values Z. When the X axis denotes change in Mach, and the Y axis denotes change in altitude, the transfer characteristic continuously changes with Mach but is a discrete step change with change of altitude. Normally, transfer characteristic $F_1X$ would thus be used between the altitudes of $Y_1$ and $Y_2$. However, a more accurate transfer characteristic may be derived if interpolation were used. The novel means for interpolation is based on decreasing and increasing ramps (variable attenuation) to provide fade-out and fade-in of proportional values of the transfer characteristics, such as $F_1X$ and $F_2X$ as a zone from $Y_1$ to $Y_2$ is traversed.

To mathematically derive the desired interpolation, by referring also to FIGURE 2 it will be noted that the traverse across one zone of Y, such as between $Y_1$ and $Y_2$, is "*dy*," and any portion of the traverse of the zone is "*y*." For interpolation, the value of Z of the transfer characteristic $F_1X$ extends along the decreasing ramp $S_1$ from a value A at $Y_1$ to zero at $Y_2$, where the decreasing ramp $S_1$ is given as $$1-\frac{y}{dy}$$

and the varying value of $F_1X$ is $$Z_A=A\left(1-\frac{y}{dy}\right)$$

Conversely, the value Z of the adjacent transfer characteristic $F_2X$ extends along the increasing ramp $S_2$ from O at $Y_1$ to a value B at $Y_2$, where the increasing ramp $S_2$ is given by $y/dy$ and the varying value of $F_2X$ is $$Z_B=B\left(\frac{y}{dy}\right)$$

Thus, a transfer characteristic interpolated at "y" will have the combined proportional values of A and B, determined by the portion of the zone of Y that is traversed, and extends along a resulting ramp $S_3$ having a value A at $Y_1$ and B at $Y_2$. Accordingly, the interpolated transfer characteristic value along ramp $S_3$ is $$Z_{A+B}=A\left(1-\frac{y}{dy}\right)+B\left(\frac{y}{dy}\right)$$

A novel circuit constructed according to the invention is shown in FIGURE 3 for attenuating a carrier signal by continuous transfer function signals of one variable and discrete step signals of a second variable, and having interpolation means to derive more precise continuous transfer function signals. A carrier signal $E_i$ is applied to cascaded linear alternating voltage attenuators 10 and 12, and 11 and 13, respectively. The output of attenuator 12 is applied to attenuator 13 whose output $E_o$ is the attenuated carrier signal derived by interpolation. To attenuate the alternating voltage signal $E_i$ by the continuously varying transfer functions $F_1X$, $F_2X$, $F_3X$, and/or $F_4X$, function generators and linear alternating voltage attenuators are used in the manner shown and described in copending patent application Serial No. 58,790 of A. S. Robinson, W. Henn and M. Tietelbaum, filed September 27, 1960, now abandoned, and assigned to the same assignee as this application.

A direct voltage $E_x$ representing the independent variable X is applied to function generators 20, 21, 22 and 23 which provide direct current transfer function signals $I_{f1}$, $I_{f2}$, $I_{f3}$ and $I_{f4}$ that are applied to AND gates $G_1$, $G_2$, $G_3$ and $G_4$, respectively. Each of the function generators 20 to 23 include two shaping networks (not shown), one for increasing slopes and the other for decreasing slopes, and a summing means (not shown) so each of the transfer function signals is bidirectional and conforms to the desired parametric control function of the respective transfer characteristic. The outputs of gates $G_1$ and $G_3$ are connected to a control winding (not shown) of attenuator 10, while the outputs of gates $G_2$ and $G_4$ are connected to a control winding (not shown) of attenuator 11. The attenuated output signal $E_1$ from attenuator 10 is $K(I_{f1})E_i$ or $K(I_{f3})E_i$, and the output signal $E_2$ from attenuator 11 is $K(I_{f2})E_i$ or $K(I_{f4})E_i$, where K represents constant attenuation in response to a unit of current. The transfer functions of Y are discrete step signals $P_1$, $P_2$, $P_3$ and $P_4$, and determine which of the transfer function signals $I_{f1}$ to $I_{f4}$ are applied to attenuators 10 and 11 at any one time. The discrete step signals $P_1$ to $P_4$ are derived by a modification of a signal commutator and control shown and described in copending patent application Serial No. 39,290 of W. Henn and M. Tietelbaum, filed June 28, 1960, and assigned to the same assignee as this application. The commutator of application Serial No. 39,290 provides only a single discrete step signal at any one time and includes control network interlocks to insure singular signal transmission. By removing the interlocks or providing two banks of interlocked control networks for simultaneous singular signal transmission, and overlapping the transparent segments of the disc, as shown in FIGURE 3 of the drawings of the present application, simultaneous transmission of two step signals may be obtained. Although the discrete step signals, the transfer function signals and the implementation therefor have been limited in number, it is for facility of description and is not to be construed as a limitation of the invention.

A commutator 30 for deriving discrete step signals as a function of the variable Y has a rotating shaft 31 with an opaque disc 32. Disc 32 has a transparent area 33 comprised of overlapping segments *33a*, *33b*, *33c* and *33d* for passing light from a source (not shown) simultaneously through two adjacent transparent segments, depending on the angular position of the shaft 31. A plurality of light sensitive elements 34, 35, 36 and 37 are disposed opposite the light source, on the other side of the disc 32, and control ON-OFF states of control networks 38, 39, 40 and 41, respectively, having outputs connected to respective gates $G_1$, $G_2$, $G_3$ and $G_4$ to provide the qualifying discrete step signals $P_1$, $P_2$, $P_3$ and/or $P_4$ to two adjacent gates. In this manner, two adjacent gates are passing two continuous transfer function signals as a function of the variable X to the attenuators 10 and 11.

To attenuate the signals $E_1$ and $E_2$ by interpolation, wipers of a pair of linear potentiometers or similar devices 42 and 43 are mounted on a shaft 44 connected to shaft 31 by a gear train 45. Each potentiometer is wound to provide increasing resistance by half of its winding and decreasing resistance by the other half as the associated wiper rotates 360°. The respective wipers are positioned oppositely to one another so a minimum signal from one of the potentiometers 42 or 43 is attended by a maximum signal from the other, as is clearly shown in FIGURE 4. The gear train 45 provides a ratio of $\theta$:1, where $\theta$ is the angular displacement of the shaft 31 required to move any one of the segments of the transparent areas 33, except segment *33a*, across the light beam to provide a discrete step signal. This represents traversing two zones of Y, such as from $Y_1$ to $Y_3$ or $Y_2$ to $Y_4$. Therefore, the output or proportioning signals $I_2$ and $I_3$ of potentiometers 42 and 43, respectively each provide an increasing ramp signal and a decreasing ramp signal during the traverse of the variable for each discrete step signal. The output signal $I_2$ from potentiometer 42 is applied to a control winding (not shown) of attenuator 12 that receives signal $E_1$ from attenuator 10 and provides an output $E_3=K(I_2)E_1$ that is transmitted to attenuator 13. The output signal $I_3$ of potentiometer 43 is applied to a control winding (not shown) of attenuator 13 to derive an attenuation of signal $E_2$ as $K(I_3)E_2$ that is added to signal $E_3$ to provide a final interpolated signal $$E_o=[K(I_3)E_2]+E_3,\text{ or }E_o=[K(I_3)E_2]+[K(I_2)E_1]$$

that is the same as the mathematically derived equation for slope $S_3$.

Equation $$Z_{A+B}=A\left(\ -\frac{y}{dy}\right)+B\left(\frac{y}{dy}\right)$$

may be further solved to $$Z_{A+B}=A+(B-A)\frac{y}{dy}$$

A modification of the circuit of FIGURE 3, is shown in FIGURE 5, capable of attenuating a carrier signal according to the latter equation utilizing three step attenuation. From the mathematically derived equation $$Z_{A+B}=A+(B-A)\frac{y}{dy}$$

it is readily seen that only one decreasing ramp is required.

Referring now specifically to FIGURE 5, the carrier signal $E_i$ is applied to cascaded attenuators 50 and 51, and to attenuator 52 whose output $E_5$ is applied to attenuator 51 to derive the attenuated carrier signal $E_o$. The direct voltage $E_x$, representative of the variable X, again is applied to function generators 20, 21, 22 and 23 to derive transfer function signals $I_{f1}$, $I_{f2}$, $I_{f3}$ and $I_{f4}$, respectively. Transfer function signals $I_{f1}$ and $I_{f4}$ are applied to AND gates $G_5$ and $G_{10}$, respectively, while transfer function signals $I_{f2}$ and $I_{f3}$ are applied to AND gates $G_6$ and $G_7$, and $G_8$ and $G_9$, respectively. A commutator 53, of character shown and described in the application Serial No. 39,290, singularly applied discrete step signals $P_5$, $P_6$ and $P_7$ to AND gates $G_5$ and $G_6$, $G_7$ and $G_8$, and $G_9$ and $G_{10}$, respectively, as determined by the angular position of the disc (not shown). The outputs of gates $G_6$, $G_8$ and $G_{10}$ are interconnected and connected to a control winding (not shown) of attenuator 50. The outputs of gates $G_5$, $G_7$ and $G_9$ are interconnected and are connected to a control winding (not shown) of attenuator 50 in opposition to the outputs of gates $G_6$, $G_8$ and $G_{10}$, and to a control winding (not shown) in attenuator 52.

Considering interpolation again in the zone from $Y_1$ to $Y_2$, the commutator 53 transmits a discrete step signal $P_5$ to AND gates $G_5$ and $G_6$ that now pass transfer function signals $I_{f1}$ and $I_{f2}$ to attenuators 50 and 52. The attenuated output $E_4$ from attenuator 50, $K(I_{f2})-(I_{f1})E_1$ and output signal $E_5$ from attenuator 52, $K(I_{f1})E_1$, are applied to attenuator 51.

A potentiometer 55 has a wiper connected to a shaft 56 that is rotated by a gear train 57 from a shaft 54 that mounts the disc of the commutator 53. The gear train 57 again has a $\theta$:1 ratio, the value of $\theta$ being the same as previously described. Because only one ramp (proportional attenuation) is required, potentiometer 55 is wound to provide a maximum to a minimum resistance as the wiper rotates 360 degrees during the traverse each discrete step signal, as is clearly shown in FIGURE 6. The resulting proportioning signal $I_4$ from potentiometer 55 is applied to a control winding (not shown) of attenuator 51, to derive an attenuated signal $K(I_4)E_4$, of signal $E_4$, that is added to signal $E_5$ to derive the interpolated attenuated signal $E_o=E_5+K(I_4)E_4$, or $$E_o=K(I_{f1})E_1+[K(I_{f2})-(I_{f1})E_1]I_4$$

that corresponds to $$Z_{A+B}=A+(B-A)\frac{y}{dy}$$

Although not shown, when interpolation is not required, by combining the function generators 20, 21, 22 and 23, the commutator 53, attenuator 50 and a plurality of AND gates, the carrier signal $E_1$ may be attenuated by continuous transfer function signals of an independent variable X, and discrete step signals as a function of another independent variable Y.

Referring to FIGURE 7, a modified means to selectively provide transfer function signals $I_{f1}$ or $I_{f3}$, and $I_{f2}$ or $I_{f4}$ to the attenuators 10 and 11, respectively, is shown. In this arrangement, the source of voltage $E_x$ is connected to function generators 20, 21, 22 and 23 by AND gates $G_{11}$, $G_{12}$, $G_{13}$ and $G_{14}$, respectively. The AND gates $G_1$, $G_2$, $G_3$ and $G_4$ of the circuit of FIGURE 1 are eliminated, and the outputs of generators 20 and 22 are interconnected and now directly connected to the control winding (not shown) of attenuator 10, while the outputs of generators 21 and 23 are interconnected and now directly connected to the control winding (not shown) of attenuator 11. The outputs of control networks 38, 39, 40 and 41 are connected to respective gates $G_{11}$, $G_{12}$, $G_{13}$ and $G_{14}$. Transmission of discrete step signals $P_1$, $P_2$, $P_3$ and/or $P_4$ qualifies the respective gates to pass voltage $E_x$ to the associated function generators to generate the required transfer function signals.

While three embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A circuit for attenuating a carrier signal as a function of two independent variables, comprising means for deriving signals representing discrete step values of the first variable, means for generating signals representing continuous transfer characteristics at the discrete step values of the first variable as a function of the second variable, means adapted to receive the carrier signal and to attenuate the carrier signal by the transfer function signals, and gate means responsive to the signals representing discrete step values for selectively providing the transfer function signals at corresponding discrete step values to the carrier signal attenuating means in accordance with the signals representing discrete step values.

2. The circuit according to claim 1, having means responsive to the first variable to provide signals to the attenuating means for proportioning the attenuation according to the relative change of value of the first variable between its discrete step values of the transfer function signals being applied to the attenuating means.

3. A circuit for attenuating a carrier signal as a function of two independent variables, comprising means for deriving signals representing discrete step values of the first variable and having control networks for simultaneously transmitting signals representing each two adjacent discrete step values as a function of the first variable, non-linear wave forming networks for generating signals representing continuous transfer characteristics at the discrete step values of the first variable as a function of the second variable, linear alternating voltage attenuating means adapted to receive and to attenuate the carrier signal by the transfer function signals, gate means responsive to the discrete step signals for providing to the attenuating means two transfer function signals at the discrete step values of the discrete step signals, and means for providing proportioning signals to the attenuating means in response to the first variable to modify the attenuation according to the proportional traverse of the first variable between its two discrete step values of the transfer function signals attenuating the carrier signal.

4. The circuit according to claim 3 in which the gating means connects the non-linear wave forming networks to the attenuating means for passing selectively the transfer function signals in response to the discrete step signals.

5. The circuit according to claim 3 in which the gating means connects the non-linear wave forming networks to a common source of voltage representing the second variable for passing the voltage to selected networks in response to the discrete step signals to provide the transfer function signals to the attenuating means.

6. The circuit according to claim 3 in which the linear alternating voltage attenuating means comprises a first pair of induction devices adapted to receive the carrier signal, each device receiving one of the transfer function signals to attenuate the carrier signal, and a second pair of induction devices singularly connected in cascade to the first pair of devices to receive the associated attenuated carrier signals, each of the second pair of devices receiving a proportioning signal representing the proportional traverse of the first variable relative to the discrete step value of the transfer function signal of the associated device of the first pair for deriving a proportional attenuated carrier signal, the second pair of devices being interconnected to transmit the proportional attenuated carrier signal of one of the devices to the other for summing with the proportional attenuated signal of the other device to derive the carrier signal attenuated as a function of the two variables.

7. A circuit for attenuating a carrier signal as a function of two independent variables, comprising means for deriving and singularly transmitting signals representing discrete step values of the first variable, non-linear wave forming networks for generating signals representing continuous transfer characteristics at the discrete step values of the first variable as a function of the second variable, linear alternating voltage attenuating means adapted to receive and to attenuate the carrier signals by the transfer function signals, gate means responsive to the discrete step signals for providing to the attenuating means a first transfer function signal at the discrete step value of the discrete step signal and a second transfer function signal at the following discrete step value, and means to provide a proportioning signal to the attenuating means in response to the first variable to modify the attenuation by the transfer function signals according to the proportional traverse of the first variable between its two discrete step values of the transfer function signals attenuating the carrier signal.

8. The circuit according to claim 7 in which the gating means connects the non-linear wave forming networks to the attenuating means for passing selectively the transfer function signals in response to the discrete step signals.

9. The circuit according to claim 7 in which the gating means connects the non-linear wave forming networks to a common source of voltage representing the second variable for passing the voltage to selected networks in response to the discrete step signals to provide the transfer function signals to the attenuating means.

10. The circuit according to claim 7 in which the linear alternating voltage attenuating means comprises a pair of induction devices adapted to receive the carrier signal, the first device of the pair receiving the first transfer function signal for attenuating the carrier signal, the second device of the pair receiving the second transfer function signal and the first transfer function signal in opposition thereto for attenuating the carrier signal by the difference between both transfer function signals, and a third induction device receiving the proportioning signal being connected in cascade to the second device to receive the carrier signal attenuated by the difference between the transfer function signals for attenuation by proportioning signal, the first device being connected to the third device for transmitting its attenuated carrier signal to be summed with proportioning signal attenuated carrier signal for deriving the carrier signal attenuated as a function of the two variables.

References Cited in the file of this patent

UNITED STATES PATENTS

| | | |
|---|---|---|
| 2,574,438 | Rossi et al. | Nov. 6, 1951 |
| 2,996,706 | Newell et al. | Aug. 15, 1961 |
| 3,025,000 | Taback | Mar. 13, 1962 |
| 3,030,022 | Gittleman | Apr. 17, 1962 |